(12) United States Patent
Doyle et al.

(10) Patent No.: US 8,381,529 B2
(45) Date of Patent: Feb. 26, 2013

(54) SYSTEM AND METHOD FOR WATER INJECTION IN A TURBINE ENGINE

(75) Inventors: Roger Doyle, Greenville, SC (US); Steven Backman, Simpsonville, SC (US); William Seely, Taylors, SC (US); Leslie Tong, Roswell, GA (US); Carlos Hein, Greenville, SC (US); Steven Rose, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1065 days.

(21) Appl. No.: 12/362,442

(22) Filed: Jan. 29, 2009

(65) Prior Publication Data

US 2010/0186366 A1 Jul. 29, 2010

(51) Int. Cl.
  *F02C 1/00* (2006.01)
(52) U.S. Cl. ......................... 60/772; 60/39.53
(58) Field of Classification Search .............. 60/39.094, 60/39.53, 775, 772, 779
  See application file for complete search history.

(56) References Cited

U.S. PATENT DOCUMENTS

| | | | | |
|---|---|---|---|---|
| 5,720,164 | A * | 2/1998 | Corbett et al. | 60/39.53 |
| 6,145,294 | A * | 11/2000 | Traver et al. | 60/776 |
| 6,250,064 | B1 * | 6/2001 | Tomlinson et al. | 60/775 |
| 6,397,602 | B2 | 6/2002 | Vandervort et al. | |
| 6,478,289 | B1 * | 11/2002 | Trewin | 261/27 |
| 6,553,753 | B1 * | 4/2003 | Payling et al. | 60/39.53 |
| 2005/0034463 | A1 * | 2/2005 | Simpson et al. | 60/775 |

* cited by examiner

*Primary Examiner* — Phutthiwat Wongwian
(74) *Attorney, Agent, or Firm* — Fletcher Yoder P.C.

(57) ABSTRACT

A system includes a water injection system configured to supply water from a pressure regulating valve to a water manifold of a turbine engine. The system also includes a drain valve configured to drain at least a portion of the water from the pressure regulating valve during a start-up period of the water injection system at least until a stable water pressure is achieved downstream of the pressure regulating valve.

19 Claims, 10 Drawing Sheets

SYSTEM AND METHOD FOR WATER INJECTION IN A TURBINE ENGINE

BACKGROUND OF THE INVENTION

The subject matter disclosed herein relates to a turbine engine and, more specifically, to a system and method for water injection.

A turbine engine may include one or more combustors, which receive and combust compressed air and fuel to produce hot combustion gases. Under certain operating conditions (e.g., liquid fuel operation), water may be injected into the combustors to reduce emissions of oxides of nitrogen (NOx) and/or carbon monoxide (CO), among other exhaust emissions. Unfortunately, flow instabilities may occur in the water lines during start-up conditions. For example, pressure oscillations may occur between a water injection system and a pressure regulating valve upstream of the water injection system. More specifically, the pressure regulating valve may be unable to transition to a low flow rate during initiation of the water injection system. These flow instabilities may cause substantial delay in the setup and operation of the turbine engine with a liquid fuel.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a water injection system configured to supply water from a pressure regulating valve to a water manifold of a turbine engine. The system also includes a drain valve configured to drain at least a portion of the water from the pressure regulating valve during a start-up period of the water injection system at least until a stable water pressure is achieved downstream of the pressure regulating valve.

In a second embodiment, a system includes a water injection controller configured to control water flow into a water manifold of a turbine engine. The water injection controller is also configured to control water flow downstream from a pressure regulating valve based on flow instability during a start-up period.

In a third embodiment, a method includes controlling a drain valve to stabilize water pressure between a pressure regulating valve and a water injection system. The method also includes activating the water injection system to deliver water to a water manifold of a turbine engine after stabilizing the water pressure via controlling the drain valve.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may reduce flow instabilities within a water injection system during a start-up period. Certain embodiments may include a drain valve coupled to a water line that connects a pressure regulating valve to the water injection system. During the start-up period, if water injection system activation criteria are met, the drain valve may be opened. With the drain valve open, water flows from the pressure regulating valve to both the water injection system and the drain. The water injection system may be activated after stable water flow is detected at an inlet to the water injection system. The drain valve may be closed after a desired flow rate through the water injection system is achieved. Finally, water flow rate may be ramped to a desired level based on fuel flow through the turbine system. In this manner, stable water flow through the water injection system at start-up may be achieved, facilitating proper water flow to the turbine engine.

Figure 1:
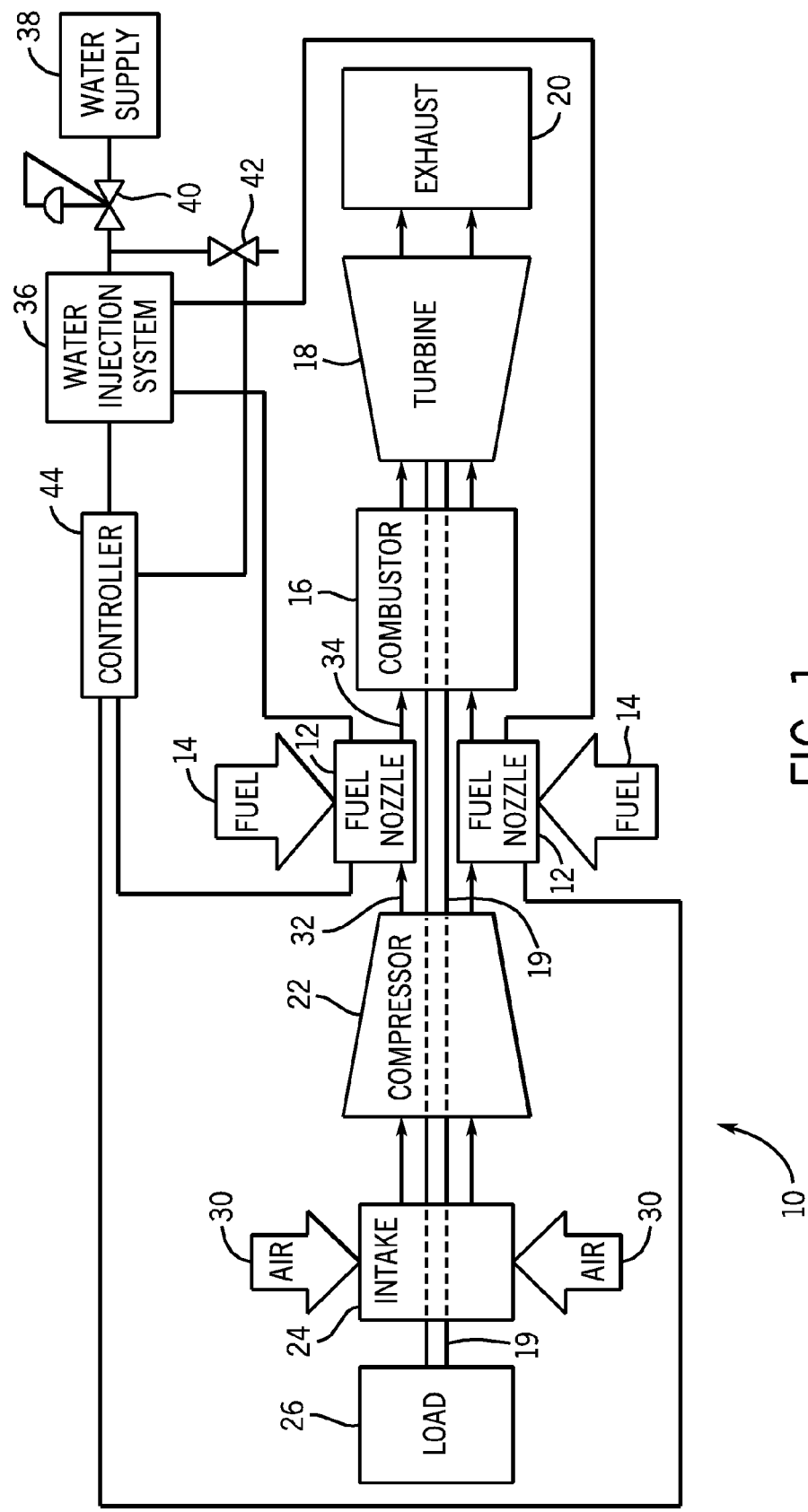
FIG. 1 is a block diagram of a turbine system having a water injection system configured to establish stable water flow prior to activation in accordance with certain embodiments of the present technique.

Turning now to the drawings and referring first to FIG. 1, a block diagram of an embodiment of a gas turbine system 10 is illustrated. The diagram includes fuel nozzle 12, fuel supply 14, and combustor 16. As depicted, fuel supply 14 routes a liquid fuel and/or gas fuel, such as natural gas, to the turbine system 10 through fuel nozzle 12 into combustor 16. The fuel nozzle 12 is configured to inject and mix the fuel with compressed air. The combustor 16 ignites and combusts the fuel-air mixture, and then passes hot pressurized exhaust gas into a turbine 18. The exhaust gas passes through turbine blades in the turbine 18, thereby driving the turbine 18 to rotate. In turn, the coupling between blades in turbine 18 and shaft 19 will cause the rotation of shaft 19, which is also coupled to several components throughout the turbine system 10, as illustrated. Eventually, the exhaust of the combustion process may exit the turbine system 10 via exhaust outlet 20.

In an embodiment of turbine system 10, compressor vanes or blades are included as components of compressor 22. Blades within compressor 22 may be coupled to shaft 19, and will rotate as shaft 19 is driven to rotate by turbine 18. Compressor 22 may intake air to turbine system 10 via air intake 24. Further, shaft 19 may be coupled to load 26, which may be powered via rotation of shaft 19. As appreciated, load 26 may be any suitable device that may generate power via the rotational output of turbine system 10, such as a power generation plant or an external mechanical load. For example, load 26 may include an electrical generator, a propeller of an airplane, and so forth. Air intake 24 draws air 30 into turbine system 10 via a suitable mechanism, such as a cold air intake, for subsequent mixture of air 30 with fuel supply 14 via fuel nozzle 12. As will be discussed in detail below, air 30 taken in by turbine system 10 may be fed and compressed into pressurized air by rotating blades within compressor 22. The pressurized air may then be fed into fuel nozzle 12, as shown by arrow 32. Fuel nozzle 12 may then mix the pressurized air and fuel, shown by numeral 34, to produce a suitable mixture ratio for combustion, e.g., a combustion that causes the fuel to more completely burn, so as not to waste fuel or cause excess emissions.

In certain embodiments, the system 10 may include water injection, via fuel nozzles 12, to reduce emissions associated with liquid fuel operation. For example, a water injection system 36 may supply water to fuel nozzles 12. The water injection system 36 may be a stand alone unit, such as a skid-mounted unit, which is separate or independent from the turbine system 10. Likewise, the water injection system 36 may be separate or independent from a water supply 38. Thus, the water injection system 36 may receive water from the water supply 38, and then act as an intermediary to route the water to the turbine system 10 (e.g., a water injection manifold). As illustrated, the water may flow through a pressure regulating valve 40 between the water supply 38 and the water injection system 36. Pressure regulating valve 40 automatically adjusts water flow to achieve a desired water pressure. However, the pressure regulating valve 40 may be configured to operate at high flow rates (not low flow rates) due to the high water demands by the water injection system 36 and turbine system 10. As a result, water pressure oscillations may develop at the pressure regulating valve 40 and/or between the valve 40 and the water injection system 36 during the low flow rates of water injection system start-up.

In the disclosed embodiments, certain control features substantially reduce or dampen the water pressure oscillations to provide stable water flow during low water flow and/or start-up conditions, thereby reducing downtime and complications associated with liquid fuel setup and operation. For example, turbine system 10 includes a drain valve 42 configured to open during water injection system initiation to establish stable flow. When a controller 44 determines that activation is appropriate for water injection system 36, then controller 44 directs drain valve 42 to open. Water then flows through drain valve 42 until water pressure has stabilized. Once controller 44 detects stable water flow, controller 44 activates water injection system 36. Controller 44 then closes drain valve 42 when a desired water flow rate is achieved. In this manner, stable water flow is established prior to activation of water injection system 36.

Figure 2:
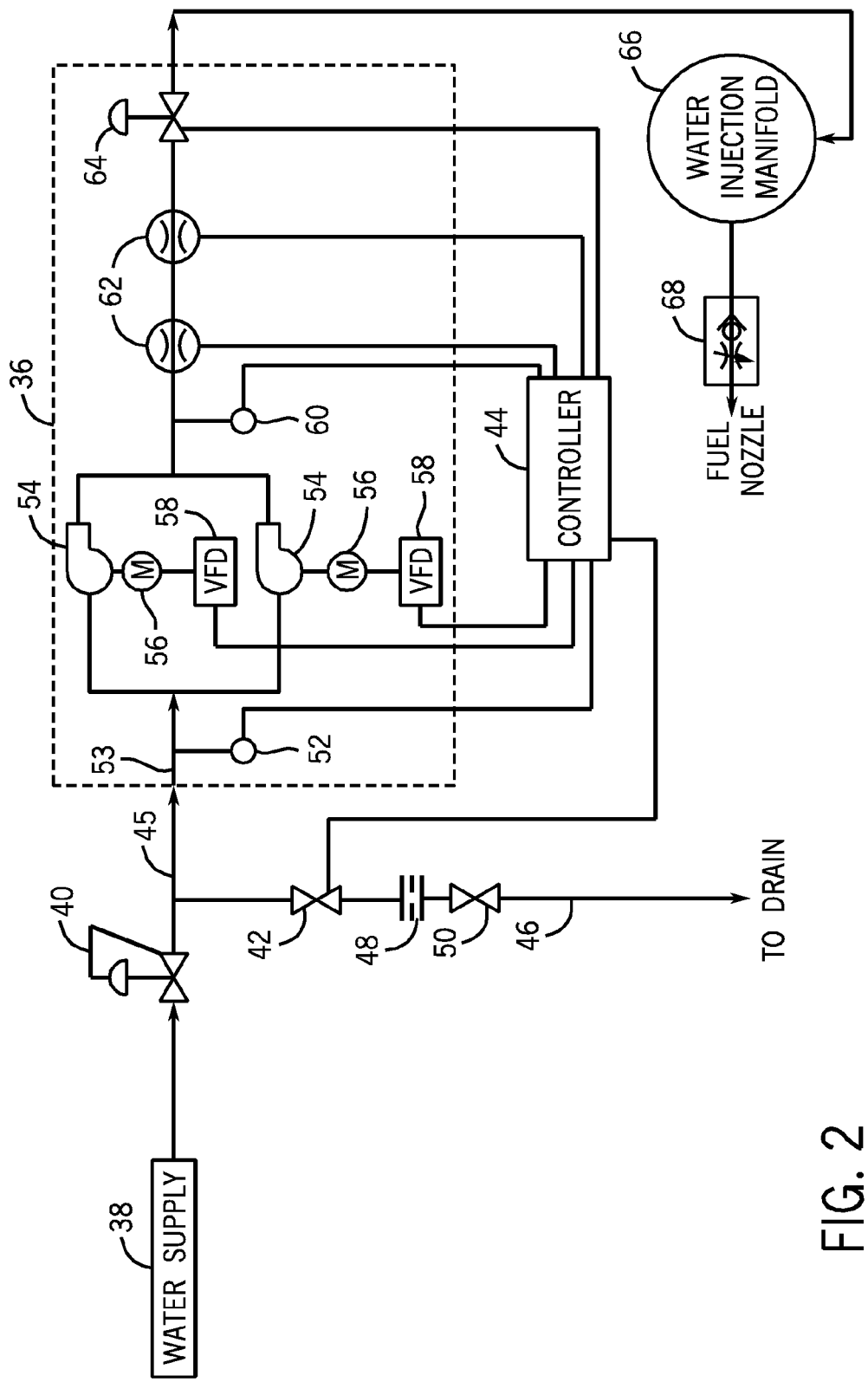
FIG. 2 is a block diagram of the water injection system, as shown in FIG. 1, in accordance with certain embodiments of the present technique.

FIG. 2 presents a detailed block diagram of the water injection system 36 shown in FIG. 1. Water flows from water supply 38 through pressure regulating valve 40 and a water conduit 45 to water injection system 36. A drain line 46 is coupled to water conduit 45 downstream of pressure regulating valve 40 and upstream of water injection system 36. Water entering drain line 46 flows through drain valve 42, an orifice 48, a manual isolation valve 50 and ultimately exits to a drain. Drain valve 42 is configured to open to establish stable water flow prior to activation of water injection system 36. Orifice 48 is configured to restrict flow through drain line 46. For example, in certain embodiments, the diameter of drain line 46 is greater than approximately 0.5, 1, 1.5, 2, 2.5, 3, or 3.5 inches, or any diameter therebetween. For example, if drain line 46 has about a 2 inch diameter, the diameter of orifice 48 may be approximately 0.25 to 0.75 inches, 0.3 to 0.7 inches, 0.4 to 0.6 inches, or approximately 0.47 inches. As a result, orifice 48 may restrict water flow such that only about 20 to 90 gallons, 30 to 80 gallons, 40 to 70 gallons, or about 60 gallons of water flows through drain line 46 during water injection system start-up. The diameter of drain line 46 and orifice 48 may be varied based on water flow criteria. For example, larger diameters may be employed for turbine systems that utilize greater water flow rates. Furthermore, manual isolation valve 50 is disposed along drain line 46 downstream from orifice 48. Manual isolation valve 50 serves to isolate water injection system 36 from the drain when water injection system 36 is inoperative. For example, if the turbine system is operating on gaseous fuel, water injection system 36 may remain inactive for long periods. Therefore, manual isolation valve 50 may be closed to seal water injection system 36.

As previously discussed, water enters water injection system 36 through water conduit 45. A pressure sensor 52 may be disposed within water injection system 36 adjacent to an inlet 53. Pressure sensor 52 is communicatively coupled to controller 44 and configured to send a signal to controller 44 indicative of water pressure. For example, during start-up, pressure sensor 52 may measure water pressure fluctuations and send a signal to controller 44 indicative of these fluctuations. Controller 44 may then analyze this signal to determine whether the fluctuations are within established parameters for water injection system activation.

Water injection system 36 is activated, in part, by engaging water pumps 54. As seen in FIG. 2, each water pump 54 is driven by a motor 56 controlled by a variable frequency drive (VFD) 58. VFDs 58 facilitate continuous variation of pump motor speed. For example, VFDs 58 may vary the frequency of electricity supplied to pump motors 56 such that pump motors 56 may be operated at different speeds. Varying the speed of pump motors 56 may change the amount of water that flows through pumps 54. VFDs 58 are commutatively coupled to controller 44 such that controller 44 may activate pumps 54 and vary their capacity. For example, when a low water flow rate is desired, controller 44 may instruct pumps 54 to operate at a low capacity via VFDs 58. Conversely, during periods of high water demand, controller 44 may instruct VFDs 58 to increase capacity of pumps 54. The embodiment presented in FIG. 2 includes two pumps 54 connected in parallel. However, other embodiments may employ either more or fewer pumps 54, arranged in parallel or serial flow configurations.

A pressure sensor 60 is coupled to water injection system 36 downstream from pumps 54 and configured to measure the pressure of water exiting pumps 54. Pressure sensor 60 is communicatively coupled to controller 44 and configured to send a signal to controller 44 indicative of water pressure. Based on this signal, controller 44 may adjust pump operation to achieve a desired water pressure. Flow meters 62 are disposed downstream from pressure sensor 60 and configured to measure the water flow rate exiting pumps 54. Flow meters 62 are communicatively coupled to controller 44 and configured to send a signal indicative of flow rate such that controller 44 may adjust pump operation to achieve a desired flow rate. Target water flow rate is based on turbine system demand. For example, during periods of high turbine load, target water flow rate may increase. In such a situation, controller 44 may increase pump speed until flow meters 62 indicate that the target flow rate has been achieved. A stop valve 64 is disposed downstream from flow meters 62. Stop valve 64 may be closed when water injection system 36 is not operating and may open upon activation of water injection system 36. Stop valve 64 may block water from entering the turbine engine when water injection is not desired (e.g., during gas fuel operation). Stop valve 64 is communicatively coupled to controller 44 such that controller 44 may open stop valve 64 in response to water injection system 36 activation.

Water from water injection system 36 flows to a water injection manifold 66 located downstream from water injection system 36. In certain embodiments, water injection manifold 66 includes a cylindrical member disposed around the turbine engine, wherein the manifold 66 is configured to deliver water to each combustor. Water injection manifold 66 may provide equal water flow to each combustor within the turbine system. Prior to entering the combustors, water flows through a flow proportioning valve 68 configured to distribute water flow to each fuel nozzle within a combustor. Water may then enter the combustor and combine with fuel and air to reduce turbine system emissions.

Figure 3:
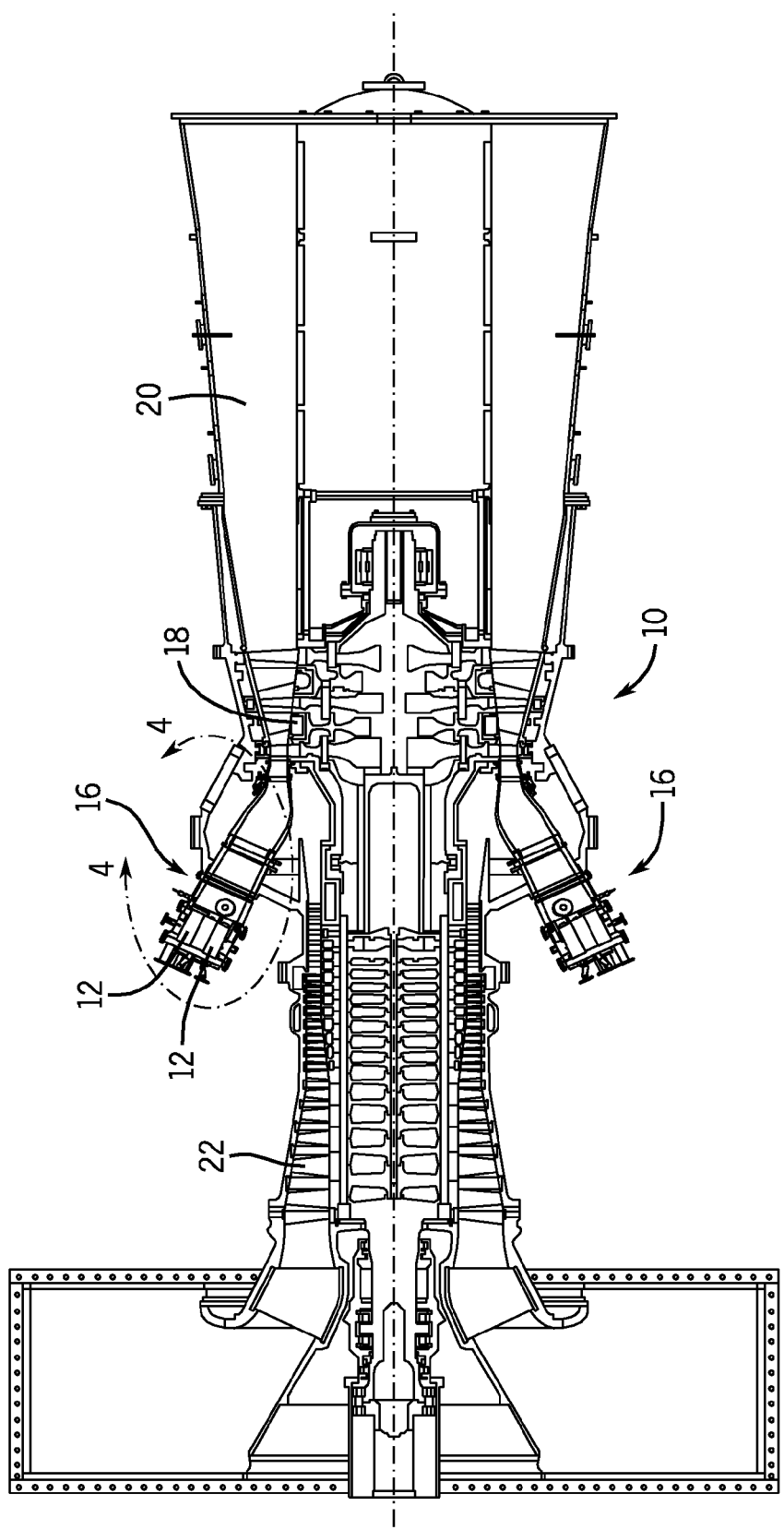
FIG. 3 is a cutaway side view of the turbine system, as shown in FIG. 1, in accordance with certain embodiments of the present technique.

FIG. 3 shows a cutaway side view of an embodiment of turbine system 10 that may be used in conjunction with the water injection system 36 with flow stabilization features of the disclosed embodiments. As discussed above, the disclosed embodiments stabilize the water flow upstream of the water injection system 36 to enable easy setup and operation of the turbine system 10 with liquid fuel and water injection. As depicted, the embodiment includes compressor 22, which is coupled to an annular array of combustors 16. For example, eighteen combustors 16 may be located in turbine system 10. Each combustor 16 includes one or more fuel nozzles 12, which feed an air-fuel mixture to a combustion zone located within each combustor 16. For example, each combustor 16 may include 1, 2, 3, 4, 5, 6, 7, 8, 9, 10, or more fuel nozzles 12 in an annular or other suitable arrangement. Combustion of the air-fuel mixture within combustors 16 will cause vanes or blades within turbine 18 to rotate as exhaust gas passes toward exhaust outlet 20.

Figure 4:
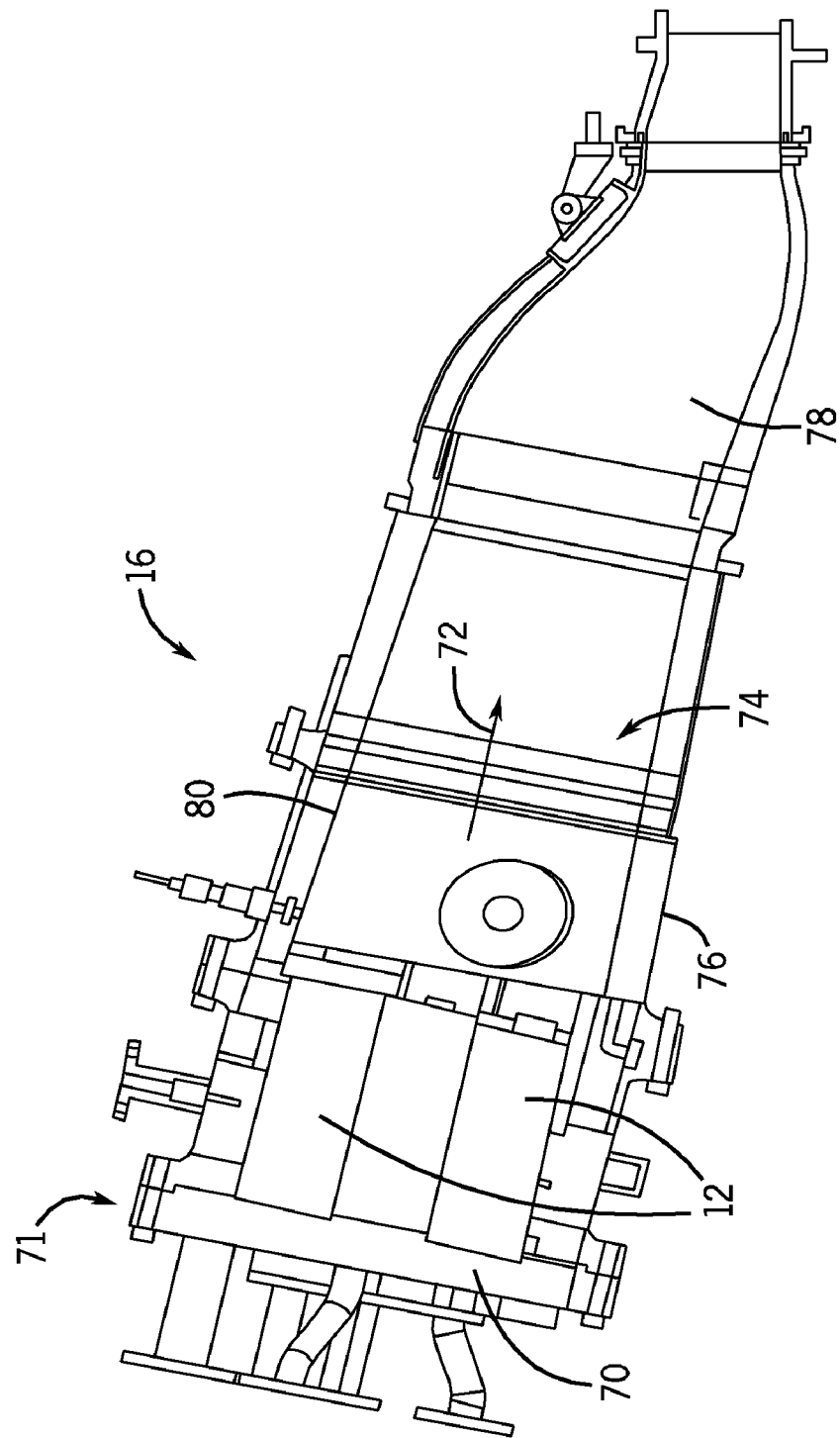
FIG. 4 is a cutaway side view of a combustor, taken within line 4-4 as shown in FIG. 3, in accordance with certain embodiments of the present technique.

FIG. 4 is a detailed cutaway side view illustration of an embodiment of combustor 16 that may be used with turbine system 10 in conjunction with the water injection system 36 with flow stabilization features of the disclosed embodiments. As discussed above, the disclosed embodiments stabilize the water flow upstream of the water injection system 36 to enable easy setup and operation of the turbine system 10 with liquid fuel and water injection in each combustor 16. As depicted, combustor 16 includes fuel nozzles 12 that are attached to an end cover 70 at a base or head end 71 of combustor 16. A typical arrangement of combustor 16 may include five or six fuel nozzles 12. Other embodiments of combustor 16 may use a single large fuel nozzle 12. The surfaces and geometry of fuel nozzles 12 are designed to provide an optimal mixture and flow path for air and fuel as it flows downstream into combustor 16, thereby enabling increased combustion in the chamber, thus producing more power in the turbine engine. The fuel mixture is expelled from fuel nozzles 12 downstream in direction 72 to a combustion zone 74 inside combustor casing 76. Combustion zone 74 is the location where ignition of the air-fuel mixture is most appropriate within combustor 16. In the illustrated embodiment, combustion zone 74 is located inside combustor casing 76, downstream from fuel nozzles 12 and upstream from a transition piece 78, which directs the pressurized exhaust gas toward turbine 18. Transition piece 78 includes a converging section that enables a velocity increase as the combusted exhaust flows out of combustor 16, producing a greater force to turn turbine 18. In turn, the exhaust gas causes rotation of shaft 19 to drive load 26. In an embodiment, combustor 16 also includes liner 80 located inside casing 76 to provide a hollow annular path for a cooling air flow, which cools the casing 76 around combustion zone 74. Liner 80 also may provide a suitable contour to improve flow from fuel nozzles 12 to turbine 18.

Figure 5:
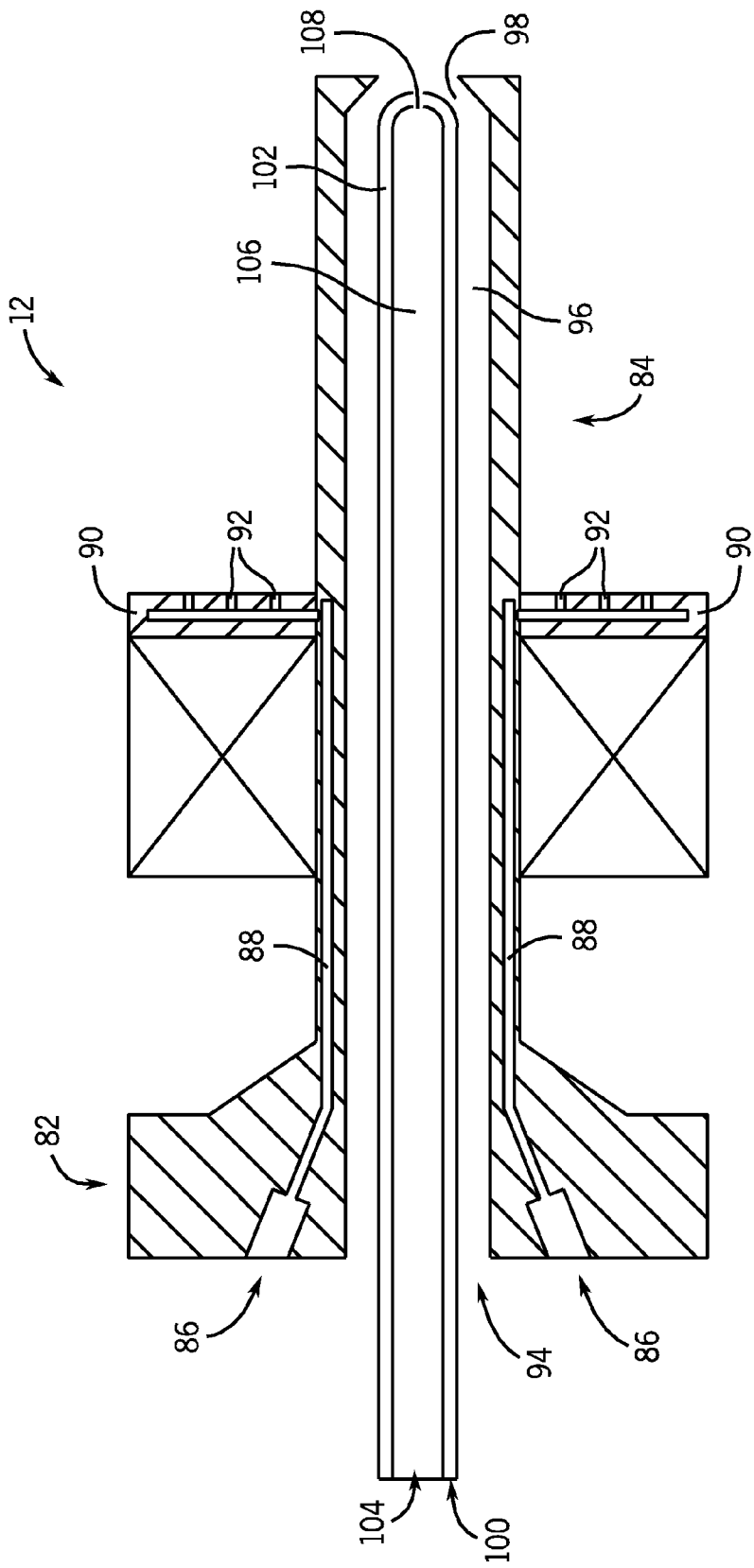
FIG. 5 is a cutaway side view of a fuel nozzle, as shown in FIG. 4, in accordance with certain embodiments of the present technique.

FIG. 5 is a cutaway side view of an exemplary fuel nozzle 12 that may be used in combustor 16 in conjunction with the water injection system 36 with flow stabilization features of the disclosed embodiments. As discussed above, the disclosed embodiments stabilize the water flow upstream of the water injection system 36 to enable easy setup and operation of the turbine system 10 with liquid fuel and water injection via fuel nozzle 12. In particular, fuel nozzle 12 is configured to supply air, water, liquid fuel and gaseous fuel to combustor 16. Fuel nozzle 12 includes a rearward supply section 82 and a forward delivery section 84. Reward supply section 82 includes inlets configured to receive fluid from the combustor head end 71. Forward delivery section 84 is configured to deliver the fluids to the combustion zone of the combustor 16. Gaseous fuel enters gas inlets 86 and flows through gas passages 88 to gaseous fuel injectors 90. Gaseous fuel injectors 90 include apertures 92 configured to transfer gaseous fuel from injectors 90 to the combustor 16. Similarly, air enters annular air inlet 94, flows through air passage 96 and exits orifice 98. In this manner, air flows from the combustor head end 71 toward the combustion zone 74. Water enters annular water inlet 100 and flows through water passage 102. Liquid fuel enters liquid fuel inlet 104 and flows through liquid fuel passage 106. Both water and liquid fuel exit fuel nozzle 12 through orifice 108. As appreciated, the addition of water to the fuel-air mixture reduces NOx and CO emissions.

Figure 6:
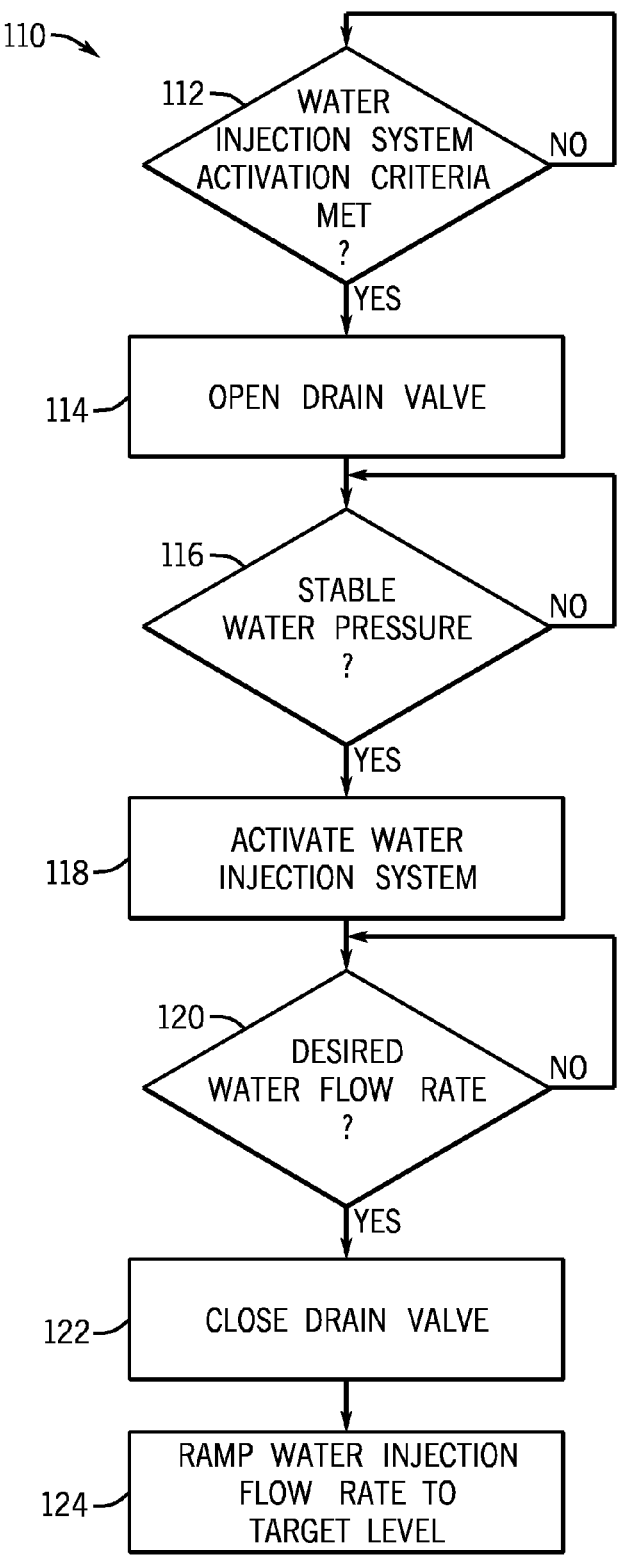
FIG. 6 is a flowchart of a method of establishing stable water flow into the water injection system prior to activation, in accordance with certain embodiments of the present technique.

FIG. 6 presents a flowchart of a method 110 of establishing stable water flow prior to activation of the water injection system 36. First, as represented by block 112, water injection system activation criteria are verified to determine whether the water injection system 36 may be activated. As discussed in detail below, the water injection system 36 may be activated in response to certain turbine system 10 operating conditions. If these conditions are satisfied, the drain valve 42 is opened, as represented by block 114. Opening the drain valve 42 allows water from the pressure regulating valve 40 to flow into the drain.

Next, as represented by block 116, water pressure at the inlet 53 to the water injection system 36 is measured to determine whether stable water pressure has been established. Water pressure stabilizes when pressure remains within a specified tolerance of a desired pressure for a particular time period. For example, in certain embodiments, desired water pressure for water injection system activation is approximately 65 psi. In such a configuration, a tolerance of ±5 psi and a minimum time of 5 seconds may be established. In other words, if water pressure remains between approximately 60 psi and 70 psi for approximately 5 seconds, method 110 may continue to the next step. These flow stability parameters, including desired pressure, tolerance and minimum time, may be varied based on turbine system 10 configurations. For example, desired pressure may be approximately 30 to 120 psi, 40 to 100 psi, 50 to 80 psi, or approximately 65 psi. In addition, tolerance may be less than about 1, 2, 3, 4, 5, 6, 7 or 8 psi, or any pressure therebetween. Similarly, minimum time may be greater than approximately 1, 2, 3, 4, 5, 6, 7 or 8 seconds, or any time therebetween.

If stable water pressure is not established, method 110 may repeat step 116 until water pressure has stabilized. In addition, method 110 may employ a timeout period after which an operator is informed that stable water flow has not been established. For example, a timeout period of approximately 30 seconds may be instituted. In such a configuration, if stable water flow has not been established within approximately 30 seconds after entering step 116, an operator is informed of the situation so corrective action may be taken (e.g., closing the pressure regulating valve 40). Shorter or longer timeout periods may be employed in alternative embodiments. For example, the timeout period may be greater than about 10, 20, 30, 40, 50, or 60 seconds, or any time therebetween.

If stable water pressure has been established, the water injection system 36 may be activated, as represented by block 118. As discussed in detail below, activation of the water injection system 36 may involve a series of steps, including turning on the pumps 54 and opening the stop valve 64. Once the water injection system 36 has been activated, method 110 proceeds to step 120 and determines whether a desired water flow rate has been established. For example, in certain embodiments the desired water injection flow rate is between about 30 to 150 gallons per minute (gpm), 60 to 120 gpm, 80 to 100 gpm, or about 90 gpm. This flow rate may correspond to a multiple of drain flow capacity. For example, drain flow capacity may be between about 10 to 50 gpm, 20 to 40 gpm, 25 to 35 gpm, or about 30 gpm. Furthermore, desired water flow rate at the water injection system inlet 53 may be greater than approximately 2, 2.5, 3, 3.5, or 4 times the drain flow rate, or any multiple therebetween. For example, if drain flow capacity is approximately 30 gpm and the multiple is approximately 3, desired flow rate at the water injection system inlet 53 may be approximately 90 gpm. Other embodiments may employ a different multiple and/or different drain and/or water injection inlet flow rates. In addition, another timeout may be employed such that an operator is informed if desired flow is not established within a certain time period after water injection system activation. In certain embodiments, this timeout period may be approximately 1 to 10 minutes, 3 to 7 minutes, 4 to 6 minutes, or approximately 5 minutes. For example, if desired water flow rate is not established after about 5 minutes, an operator is informed so that corrective action may be taken (e.g., deactivation of the water injection system 36). The timeout period may be longer or shorter in alternative embodiments.

If the desired water injection system flow rate has been established, the drain valve 42 is closed, as represented by block 122. The drain valve 42 may be configured to close over a period of time. For example, certain embodiments may close the drain valve over a period of approximately 5 to 60 seconds, 10 to 50 seconds, 20 to 40 seconds, or approximately 25 seconds. Once the drain valve 42 is closed, substantially all of the water from the water supply 38 flows into the water injection system 36, and ultimately the fuel nozzles 12. At this point, the water injection flow rate may be ramped up to a target level, as represented by block 124. The target level corresponds to the water flow criteria of the turbine system 10. For example, during high load conditions, the turbine system 10 may utilize increased water flow rates to ensure the turbine system 10 is operating within regulatory emission levels.

Figure 7:
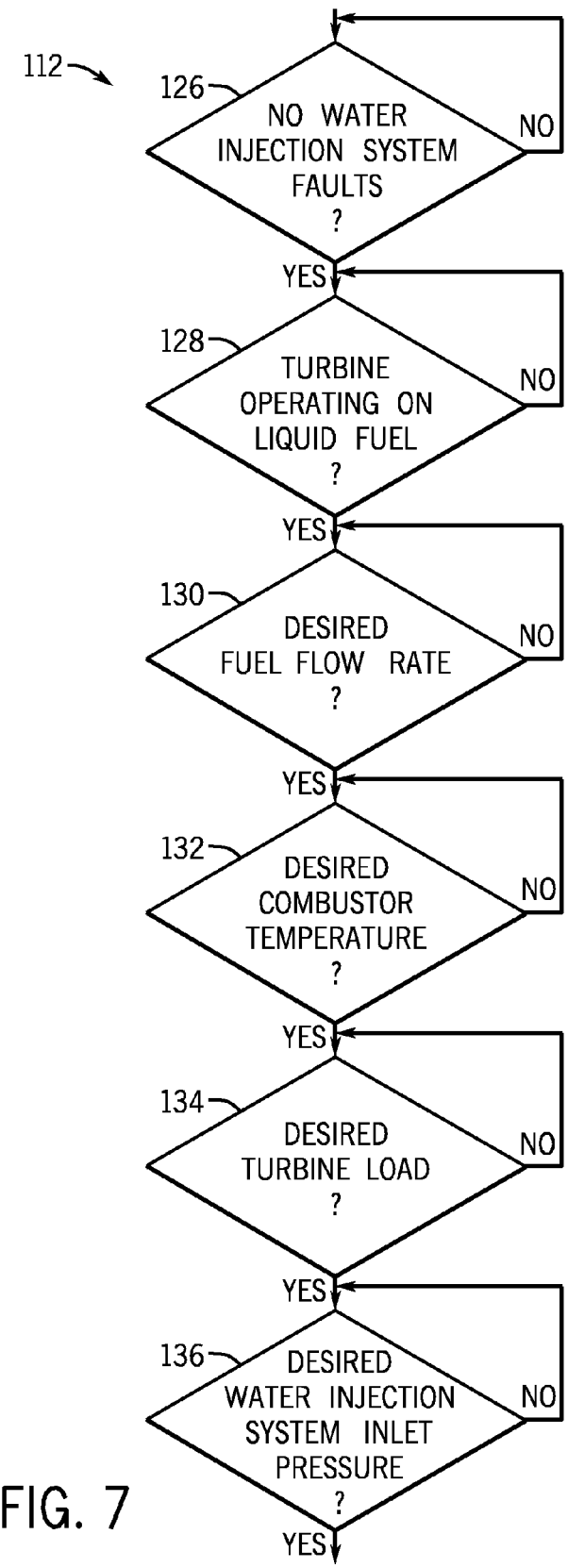
FIG. 7 is a flowchart of a method of determining whether water injection system activation criteria have been met, in accordance with certain embodiments of the present technique.

FIG. 7 shows a detailed flowchart of the steps preformed in block 112 of FIG. 6 in one embodiment. Block 112 determines whether the water injection system activation criteria have been met. The first criteria, as represented by block 126, is an absence of water injection system faults. For example, the controller 44 may poll each component (e.g., pumps 54, stop valve 64, etc.) within the water injection system 36 to determine whether it is operational. If a component is not operational, activation of the water injection system 36 may be undesirable because the system may operate inefficiently, if at all. However, if no water injection system faults are detected, method 112 may proceed to the next step.

The next step, as represented by block 128, determines whether the turbine system 10 is operating solely on liquid fuel. As previously discussed, the turbine system 10 may operate on liquid and/or gaseous fuel. During periods of gaseous fuel operation, regulatory emissions requirements may be satisfied without the use of water injection. Therefore, step 128 limits water injection system activation to liquid fuel operation in which water injection may reduce emissions to desired levels.

If the turbine system 10 is operating on liquid fuel alone, fuel flow may be examined to determine whether a sufficient fuel flow rate for water injection has been established, as represented by block 130. During periods of low fuel flow, emissions requirements may be satisfied without activation of the water injection system 36. Therefore, water utilization may be reduced by suspending water injection in such regimes. However, during periods of high fuel flow, water injection may serve to reduce turbine system emissions to acceptable levels. As a result, the water injection system 36 is activated in response to (or upon reaching) a target flow rate. If the turbine system fuel flow exceeds the target flow rate, combustor temperature may be monitored to determine whether it has reached a sufficient level for water injection system activation, as represented by block 132. Similar to step 130, operating the turbine system 10 within certain combustor temperature regimes may produce emissions within regulatory limits without the use of water injection. Therefore, the water injection system 36 may be activated when combustor temperature falls outside of this range.

If the turbine system 10 is operating at the desired combustor temperature, turbine load may be measured to determine whether the load is sufficient to activate the water injection system 36, as represented by block 134. For example, when the turbine system 10 is initiated, turbine speed may be gradually increased to a desired level before a load is applied. With regard to power generation, the turbine may be activated and set to a desired rotational rate prior to engaging the generator. Typically, emissions from the turbine system 10 do not exceed established levels while the turbine system 10 is unloaded. Therefore, the water injection system 36 may not be activated until a sufficient load is sensed.

Finally, as represented by block 136, pressure at the water injection system inlet 53 is measured to determine whether pressure has reached a desired level. For example, in certain embodiments this pressure may be about 10 to 60 psi, 20 to 40 psi, 25 to 35 psi, or about 30 psi. Other embodiments may utilize a higher or lower water injection system initiation pressure. If the desired pressure has been established, step 112 is complete and the method of establishing stable flow prior to water injection system activation may continue. However, if the desired pressure is not established, an operator may be informed of the situation after a timeout period. In certain embodiments, this timeout period may be greater than approximately 10, 15, 20, 25, 30, 35, 40, or 45 seconds, or any time therebetween. For example, if approximately 30 seconds have elapsed since step 136 commenced and desired system inlet pressure has not been established, an operator may be informed and corrective action may be taken to resolve the situation.

Figure 8:
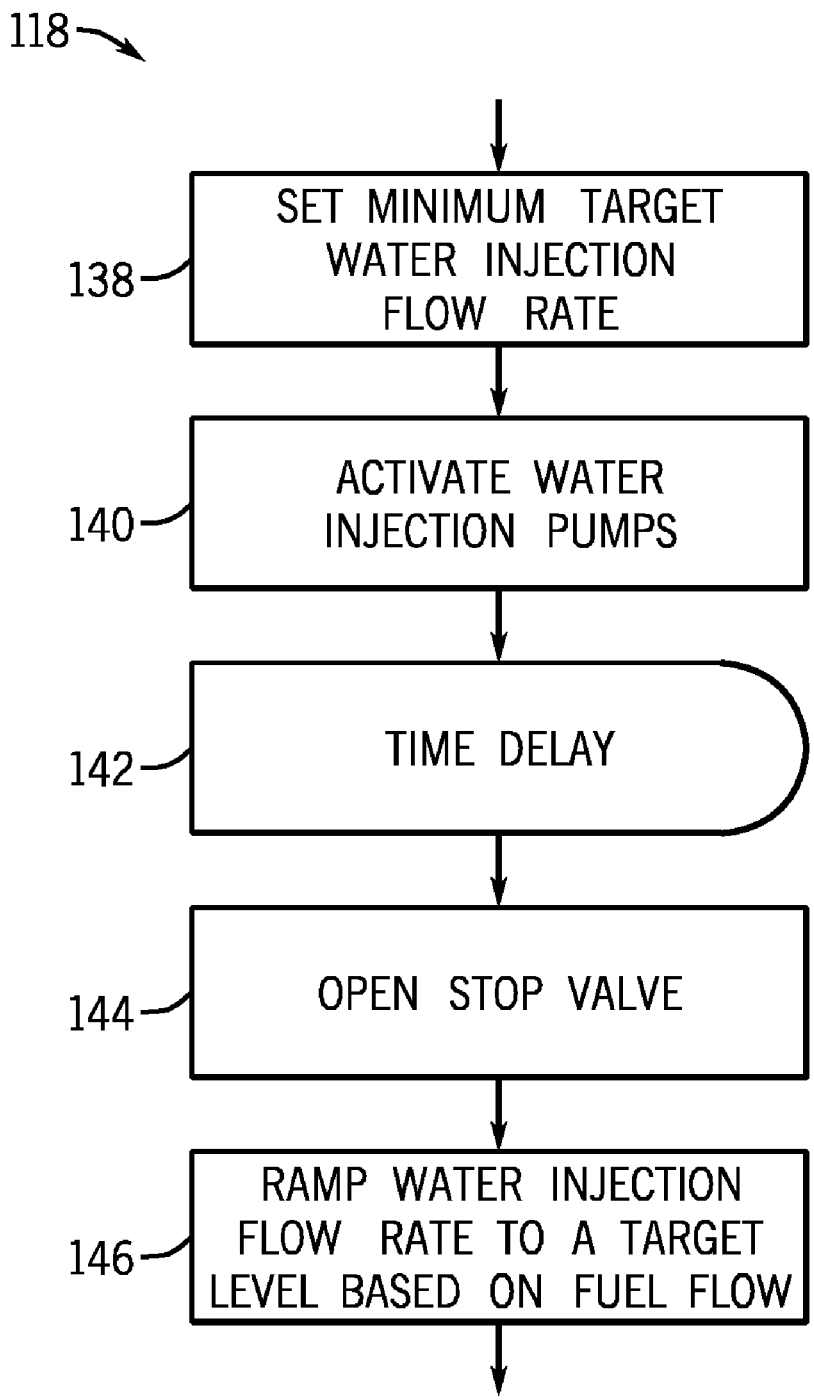
FIG. 8 is a flowchart of a method of activating the water injection system, in accordance with certain embodiments of the present technique.

FIG. 8 shows a detailed flowchart of the steps preformed in block 118 of FIG. 6 in one embodiment. Step 118 includes steps for activating the water injection system 36. First, a minimum target water injection flow rate is set, as represented by block 138. This minimum flow rate facilitates establishing stable flow through the water injection system 36 prior to ramping flow to a desired level. Once the minimum target water injection flow rate is set, the water injection pumps 54 are activated, as represented by block 140. As previously discussed, the controller 44 may activate the pumps 54 by instructing the VFDs 58 to engage the pump motors 56. Once the pumps 54 are engaged, water pressure increases throughout the water injection system 36. As represented by block 142, a time delay is implemented to facilitate this pressure increase prior to opening the stop valve 64, as represented by block 144. Once the stop valve 64 is open, water may flow through the water manifold 66 to the fuel nozzles 12 of the turbine system 10, completing the flow path from the water supply 38. At this point, water injection flow rate is ramped up to a target level, as represented by block 146. The target level may be determined based on fuel flow rate. For example, higher water flow rates may be utilized during periods of increased fuel flow to ensure compliance with emissions standards. Once the desired water injection flow rate is achieved, the method of establishing stable water flow may continue.

Figure 9:
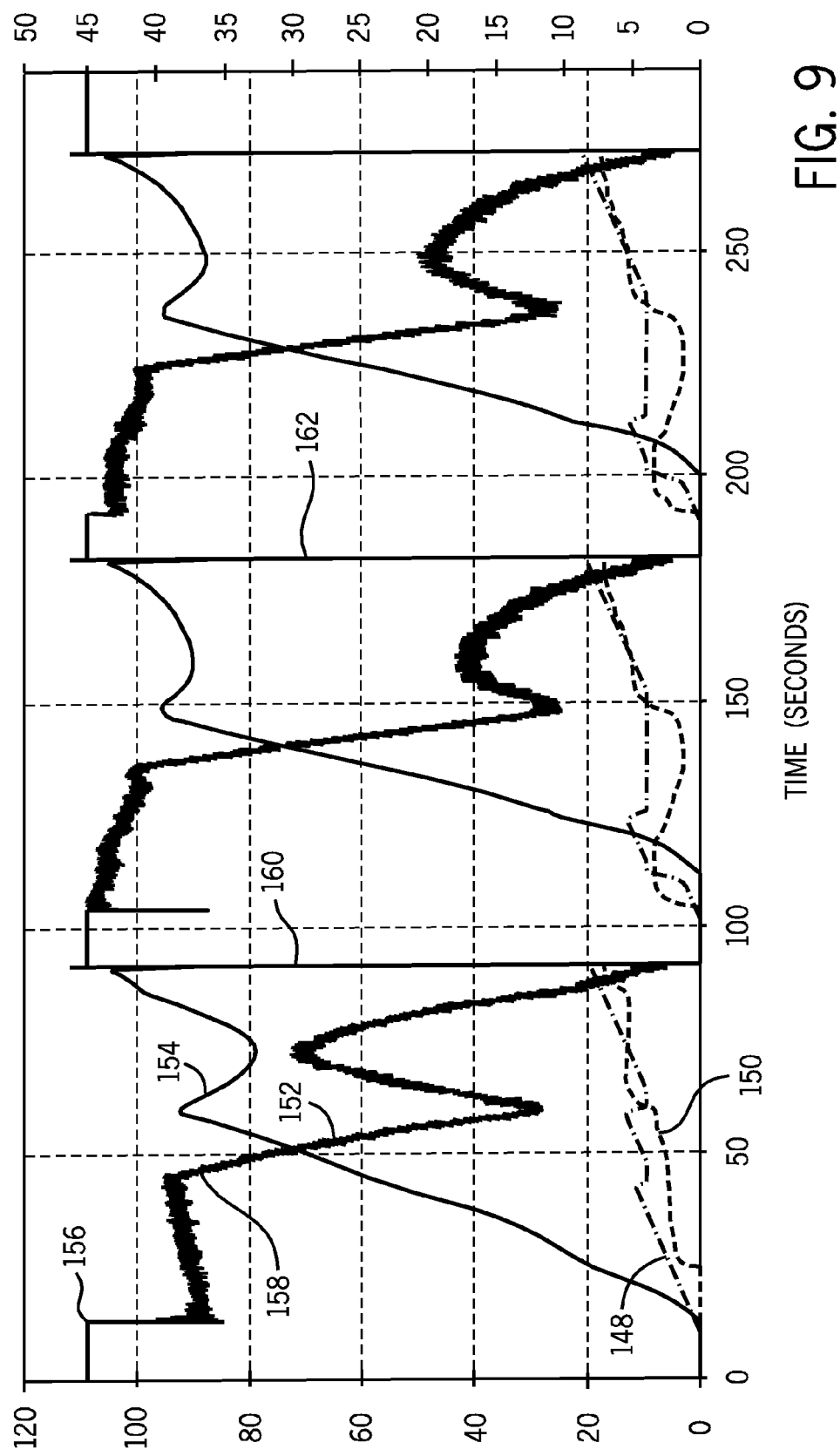
FIG. 9 is a graph of water flow rates verses time during water injection system start-up when stable flow has not been established, in accordance with certain embodiments of the present technique.

FIG. 9 is a graph of water flow rates verses time during water injection system activation when stable flow has not been established. This figure represents a situation in which the controller 44 does not activate the drain valve 42 during water injection system start-up. Curve 148 represents the desired water flow rate, curve 150 represents the actual water flow rate, curve 152 represents water pressure at the inlet 53 to the water injection system 36 and curve 154 represents commanded water injection pump output. Desired water flow rate is determined by the turbine system 10. Based on certain parameters (e.g., combustor temperature, fuel flow rate, etc.), the turbine system 10 computes a desired water flow rate sufficient to reduce emissions to acceptable levels. As illustrated by curve 148, the turbine system 10 then sends an electronic signal indicative of this desired flow rate to the water injection system controller 44.

Curve 150 represents the actual water flow rate produced by the water injection system 36. During water injection system operation, it is desirable for the actual water flow rate to substantially coincide with the desired water flow rate. As can be seen from FIG. 9, the actual water flow rate 150 is not tracking the desired water flow rate 148. As explained in detail below, this poor correlation is due to flow instabilities within the water injection system 36.

As curve 152 illustrates, inlet pressure drops sharply at approximately 20 seconds. This pressure drop 156 is due to flow instabilities within the water injection system 36. As curve 154 shows, the water injection pumps 54 are activated at approximately the same time as the inlet pressure drop 156. As previously discussed, the pressure regulating valve 40 is configured to automatically adjust flow to achieve a desired pressure. Similarly, the water injection system 36 is configured to automatically vary pump capacity to achieve a desired flow rate. When the water injection pumps 54 are activated, interaction between the pressure regulating valve 40 and the pumps 54 creates oscillations within the water injection system 36 because the pressure regulating valve 40 is not configured to transition from zero flow to low flow operation. At the pressure drop 156, the pressure regulating valve 40 is set to full open to compensate for the oscillations. A second water pressure drop 158 begins at approximately 45 seconds, in which interaction between the pressure regulating valve 40 and the pumps 54 causes water inlet pressure to drop sharply. Finally, the water injection system 36 terminates flow 160 and reinitializes. As curve 152 illustrates, water pressure at the water injection system inlet 53 drops to approximately zero at flow termination 160. Therefore, the water injection system 36 shuts down because there is very little water flow into the pumps 54. The process then repeats until a second flow termination 162, where a third attempt is made to activate the water injection system 36. As seen from FIG. 9, all three attempts are unsuccessful. In other words, actual water flow 150 never substantially coincides with desired water flow 148.

Figure 10:
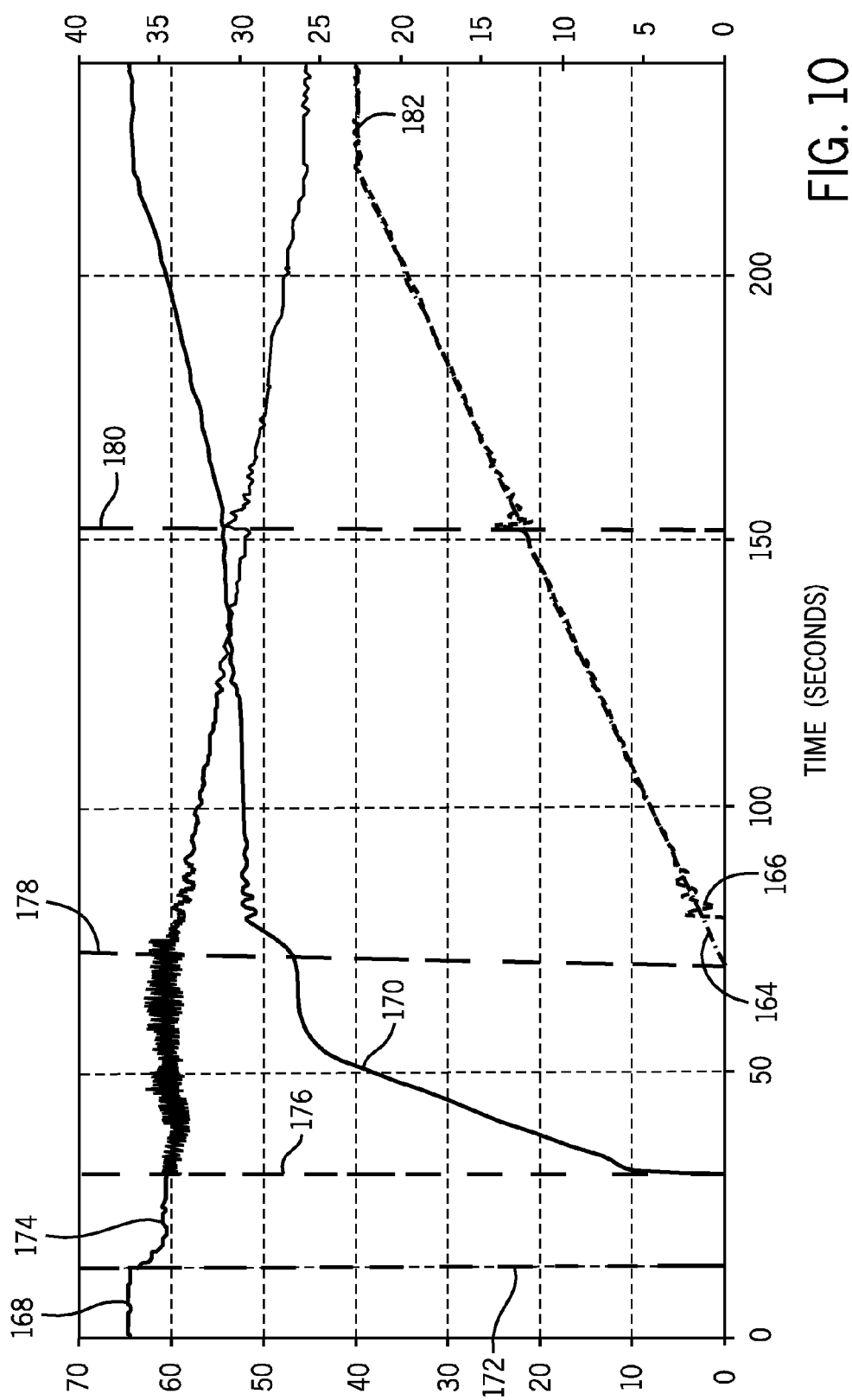
FIG. 10 is a graph of water flow rates verses time during water injection system start-up when stable flow has been established, in accordance with certain embodiments of the present technique.

FIG. 10 is a graph of water flow rates verses time during water injection system activation when stable flow is established. Curve 164 represents a desired water flow rate, curve 166 represents an actual water flow rate, curve 168 represents water pressure at the water injection system inlet 53 and curve 170 represents commanded pump capacity. As seen from curves 164 and 166, actual water flow rate closely tracks desired water flow rate, indicating a successful water injection system start-up.

At approximately 20 seconds, the drain valve 40 is opened 172. As seen from curve 168, stable water pressure is achieved 174, approximately five seconds after the drain valve 42 is opened 172. As previously discussed, water pressure stabilizes when pressure remains within a specified tolerance of a desired pressure for a particular time period. In the present embodiment, desired water pressure for water injection system activation is approximately 65 psi. Furthermore, a tolerance of about +/−5 psi and a minimum time of about 5 seconds is established. In other words, if water pressure remains between approximately 60 psi and 70 psi for approximately 5 seconds, water pressure is considered stable. As seen in FIG. 10, water pressure remains between 60 psi and 70 psi for more than five seconds after the drain valve 42 is opened 172. Therefore, based on the parameters defined above, water pressure has stabilized 174.

Once water pressure is stable, the water injection system 36 is initiated. As seen from curve 170, water pumps 54 are activated 176 approximately five seconds after stable pressure is established 174. As curve 168 illustrates, water pressure fluctuates after the pumps 54 are activated 176 due to interaction between the pumps 54 and the pressure regulating valve 40. However, these fluctuations are relatively small compared to the steep pressure drops seen in FIG. 9. At approximately 70 seconds, the stop valve 64 is opened 178, allowing water to flow into the turbine engine. Furthermore, at this point, water flow rate begins to ramp to a target level.

At approximately 152 seconds, the drain valve 42 is closed 180 because water flow rate has reached a predetermined level. At this point, the water injection system 36 may operate normally without diverting water to the drain. Finally, at approximately 230 seconds, the water injection flow rate reaches the desired level 182. As seen from curves 164 and 166, actual water flow rate closely tracks desired water flow rate throughout the entire ramp-up and steady-state flow regimes. As FIG. 10 illustrates, opening and closing the drain valve 42 facilitates stable water flow through the water injection system 36 during system initiation.

In summary, the disclosed embodiments address the pressure fluctuations associated with the pressure regulating valve 40 and the water injection system 36 both attempting to stabilize the water flow. Unfortunately, without the disclosed embodiments, the system may not be able to stabilize the water flow to the turbine engine. As a result, it may be particularly difficult to setup and use liquid fuel with the turbine engine, due to the problems associated with the water injection. Again, as discussed above, the drain valve 42 enables flow stabilization first with the pressure regulating valve 40, followed by ramping up of the water injection system 36. That is, the drain valve 42 essentially changes a simultaneous or parallel control scheme (i.e., flow control by both valve 40 and system 36) to a series or sequential control scheme (i.e., valve 40 followed by system 36). In other words, the drain valve 42 reduces or eliminates the conflict between the pressure control features of the pressure regulating valve 40 and the water injection system 36. Thus, the drain valve 42 ensures that stable flow is provided to the water injection system 36, thereby reducing or eliminating the possibility that the water injection system 36 will fight with pressure regulating valve 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a water injection system configured to supply water from a pressure regulating valve to a water manifold of a turbine engine via a water conduit;
at least one water injection pump configured to transfer water to the water manifold;
a drain valve disposed on a drain line upstream of the at least one water injection pump; and
a controller configured to control the drain valve to drain at least a portion of the water from the pressure regulating valve during a start-up period of the water injection system at least until a stable water pressure is achieved downstream of the pressure regulating valve.

2. The system of claim 1, wherein the controller is configured to instruct the drain valve to open prior to activation of the water injection system, and to gradually close during the start-up period.

3. The system of claim 1, wherein the drain valve comprises a solenoid valve.

4. The system of claim 1, wherein the controller is configured to open the drain valve after water injection system activation criteria are met, to activate the water injection system after stabilization of water pressure at an inlet to the water injection system, and to close the drain valve after water flow rate through the water injection system has reached a desired level.

5. The system of claim 1, comprising the turbine engine, wherein the turbine engine is configured to operate on a liquid fuel or a combination of a liquid fuel and a gaseous fuel.

6. The system of claim 1, wherein the water injection system comprises a self-contained unit, comprising:
the at least one water injection pump;
a plurality of flow meters in fluid communication with the at least one water injection pump and located downstream from the at least one water injection pump; and
a stop valve in fluid communication with the flow meters and located downstream from the flow meters.

7. The system of claim 1, comprising a water supply in fluid communication with the pressure regulating valve and located upstream of the pressure regulating valve.

8. A system, comprising:
a water injection controller configured to control water flow through a water conduit into a water manifold of a turbine engine, wherein the water injection controller is configured to control a drain valve on a drain line upstream of a water injection pump to drain at least a portion of the water from a pressure regulating valve during a start-up period at least until a stable water pressure is achieved downstream of the pressure regulating valve.

9. The system of claim 8, wherein the water injection controller is configured to open the drain valve after satisfying start-up criteria and achieving a desired water pressure.

10. The system of claim 8, wherein the water injection controller is configured to close the drain valve after achieving a desired water flow rate.

11. The system of claim 8, wherein the water injection controller is configured to gradually close the drain valve during the start-up period.

12. The system of claim 8, comprising a water injection system having the water injection controller, and configured to supply water from the pressure regulating valve to the water manifold of the turbine engine.

13. The system of claim 12, wherein the water injection controller is configured to activate the water injection system after establishing stable water flow.

14. A method, comprising:
controlling a drain valve on a drain line upstream of at least one water injection pump to stabilize water pressure between a pressure regulating valve and a water injection system during a start-up period; and
activating the water injection system to deliver water to a water manifold of a turbine engine after stabilizing the water pressure via opening the drain valve.

15. The method of claim 14, wherein opening the drain valve comprises opening the drain valve to stabilize the water pressure associated with the pressure regulating valve prior to activating the water injection system.

16. The method of claim 14, comprising closing the drain valve after stabilizing the water pressure associated with the pressure regulating valve, wherein closing the drain valve comprises gradually closing the drain valve to gradually increase water flow to the water injection system.

17. The method of claim 16, wherein closing the drain valve comprises gradually closing the drain valve after achieving a desired water flow rate.

18. The method of claim 14, wherein activating the water injection system comprises activating the at least one water injection pump and opening a stop valve after stabilizing the water pressure associated with the pressure regulating valve.

19. The method of claim 14, wherein activating the water injection system comprises:

setting a minimum target water injection flow rate;
activating the at least one water injection pump;
opening a stop valve after a time delay; and
ramping water injection flow rate to a target level based on fuel flow within the turbine engine.

* * * * *